US011284027B2

United States Patent
Bonin et al.

(10) Patent No.: US 11,284,027 B2
(45) Date of Patent: Mar. 22, 2022

(54) PIXEL VOLTAGE REGULATOR

(71) Applicant: Melexis Technologies NV, Tessenderlo (BE)

(72) Inventors: Andreas Bonin, Dresden (DE); Darrell Livezey, Nashua, NH (US); Jeannette Zarbock, Dresden (DE); Liqun Wu, Tessenderlo (BE); Volodymyr Seliuchenko, Nashua, NH (US)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 16/811,259

(22) Filed: Mar. 6, 2020

(65) Prior Publication Data

US 2020/0288075 A1   Sep. 10, 2020

(30) Foreign Application Priority Data

Mar. 7, 2019  (EP) .................................... 19161174

(51) Int. Cl.
*H04N 5/369* (2011.01)
*G01J 1/44* (2006.01)
*H04N 5/378* (2011.01)

(52) U.S. Cl.
CPC .............. *H04N 5/3696* (2013.01); *G01J 1/44* (2013.01); *H04N 5/3698* (2013.01); *H04N 5/378* (2013.01); *G01J 2001/446* (2013.01)

(58) Field of Classification Search
CPC .................................................. H04N 5/3698
See application file for complete search history.

(56) References Cited

U.S. PATENT DOCUMENTS

| 6,570,615 | B1 * | 5/2003 | Decker ................. H04N 9/045 348/272 |
|---|---|---|---|
| 2002/0030152 | A1 | 3/2002 | Afghahi |
| 2003/0042406 | A1 | 3/2003 | Charbon |
| 2008/0036890 | A1 * | 2/2008 | Yamashita ........... H04N 5/3598 348/308 |

(Continued)

FOREIGN PATENT DOCUMENTS

WO       2015126021 A1    8/2015

OTHER PUBLICATIONS

European Search Report of Application No. EP19161174.8, dated Jul. 31, 2019.

*Primary Examiner* — Thanh Luu
(74) *Attorney, Agent, or Firm* — Workman Nydegger

(57) ABSTRACT

A pixel circuit wherein a pixel arrangement comprises a pixel comprising a photodetector, an integrator for accumulating a signal from the photodetector, a source following output transistor for amplifying the integrated signal, and a current source for applying a readout current through the output transistor, a voltage regulating circuit comprising an amplifier, a replica transistor dimensioned substantially the same as the output transistor, and a replica current source for providing substantially the readout current through each replica transistor, a gate of the replica transistor is connected with an output node of the amplifier connected with the pixel arrangement, and a source of the replica transistor is connected with a negative input of the amplifier, and with the replica current source, a predefined reference voltage is applicable to a positive input.

7 Claims, 1 Drawing Sheet

(56) References Cited

U.S. PATENT DOCUMENTS

| | | |
|---|---|---|
| 2008/0291309 A1 | 11/2008 | Gruev et al. |
| 2010/0020217 A1 | 1/2010 | Abe et al. |
| 2010/0188132 A1* | 7/2010 | Koifman .................. G06G 7/16 |
| | | 327/359 |
| 2010/0271517 A1 | 10/2010 | De Wit et al. |
| 2011/0101205 A1 | 5/2011 | Tian et al. |
| 2013/0057335 A1* | 3/2013 | Kawai ....................... G05F 1/56 |
| | | 327/537 |
| 2015/0357369 A1 | 12/2015 | Kobayashi et al. |
| 2017/0006244 A1 | 1/2017 | Bol et al. |
| 2017/0223291 A1* | 8/2017 | Ayers .................... H04N 5/369 |

* cited by examiner

PIXEL VOLTAGE REGULATOR

FIELD OF THE INVENTION

The present invention relates to the field of pixel circuits. More specifically it relates to a regulating circuit and a method for improving the dynamic range of a pixel.

BACKGROUND OF THE INVENTION

A design goal in image sensors is to have a good image perception for dark and bright areas in scene. Therefore, pixels should be designed for a high signal swing and dynamic range. Image sensors may for example be applied in time of flight devices for which this dynamic range is particularly important.

Image sensors may for example comprise 3T (three transistor) CMOS pixels. An example of such a pixel is schematically illustrated in FIG. 1 showing a pixel which comprises a reset transistor 1, a photodetector 2, a source follower transistor 3, and a selector transistor 4. The gate of the selector transistor 4 is controlled by a row line 5 and the source is electrically connected with a column line 6. When reading out pixel signal voltages, the maximum signal range of the whole readout chain like column amplifiers and ADCs should be used to get the highest possible dynamic range of the system. Therefore, the lowest possible signal level, the "reset voltage" should be well defined and just be fitted to the lowest signal level of the read-out chain. The accumulated light signal in pixels is stored at the integration node. Before light exposure this node is reset to a certain well-defined voltage, "internal reset voltage". For readout, active CMOS pixel amplify their integration node voltages with a simple source follower transistor. So, the readout voltage is shifted by the threshold voltage of source follower transistor.

The source follower transistor has typically very small dimensions to keep the pixels fill factor high. These small dimensions make the source follower threshold voltage prone to process variations. Therefore the "reset voltage" is not well defined and prone to process, temperature and supply variations of the source follower threshold voltage.

Prior solutions for 3T pixels often use pseudo correlated double sampling "CDS" to amplify and shift the pixel output signal voltage to a bandgap referred reference voltage. This is done by a switched capacitor circuit which samples in a first phase the accumulated pixel signal and subtracts in a second phase the pixel reset voltage. The CDS stage amplifies and shifts the derived difference voltage to a bandgap stabilized reference.

An advantage of having a CDS stage is, that the pixel output signal can be simply amplified. A disadvantage is, that a CDS stage adds noise and consumes layout space (one stage for each column needed).

An example of a pixel sensor comprising an in-pixel correlated double sampling pixel is disclosed in US20100271517A1. A schematic drawing of such a pixel sensor is shown in FIG. 3 of US20100271517A1. The photodetector in this pixel sensor is adapted for accumulating radiation induced charges. A floating diffusion element (FD) is electrically coupled to an output of the photodetector through a transfer switch. A capacitor-element (C) has an input node electrically coupled to an amplifier and through the amplifier to the floating diffusion element. An output node of the capacitor-element is electrically coupled to an output of the pixel. The capacitor-element is configured to sample a reset value of the floating diffusion element during a reset sampling and to sample a signal value of the floating diffusion element during a signal sampling.

In view of the need for obtaining a good dynamic range of image sensors, there is room for systems and methods for regulating the reset voltage of a pixel.

SUMMARY OF THE INVENTION

It is an object of embodiments of the present invention to provide good methods and systems for regulating the reset voltage of a pixel.

The above objective is accomplished by a method and device according to the present invention.

In a first aspect embodiments of the present invention relate to a pixel circuit. The pixel circuit comprising a photodetector pixel arrangement and a voltage regulating circuit adapted for applying a target voltage on the pixel arrangement. The photodetector pixel arrangement comprises at least one pixel. The at least one pixel comprises a photodetector, an integrator for accumulating a signal from the photodetector, and a source following output transistor for amplifying the integrated signal. The photodetector pixel arrangement comprises a current source for biasing the source following output transistor by applying a readout current through the source following output transistor.

The voltage regulating circuit comprises an amplifier, at least one replica transistor, and a replica current source, wherein a gate of the at least one replica transistor is electrically connected with an output node of the amplifier, and the output node of the amplifier is electrically connected with the pixel arrangement for providing the target voltage, a drain of the at least one replica transistor is adapted to be electrically connected, during operation, with a power supply, and a source of the at least one replica transistor is electrically connected with a negative input of the amplifier, and with the replica current source, wherein the voltage regulating circuit is arranged such that, during operation, a predefined reference voltage can be applied to a positive input node of the amplifier.

Wherein the at least one replica transistor is dimensioned substantially the same as the output transistor of the at least one pixel and wherein the replica current source is adapted for providing substantially the same current through each replica transistor as the readout current.

It is an advantage of embodiments of the present invention that if, during operation, the reference voltage is applied to the positive input node of the amplifier and the power supply is providing power to the drain of the transistor, a target voltage is generated which is the voltage of the power supply plus the threshold voltage of the replica transistor of the voltage regulating circuit. Since the replica transistor has substantially the same dimensions as the output transistor of the pixel, and since the same bias current is applied through these transistors, also the threshold voltage of the at least one replica transistor and the threshold voltage of the output transistor of a pixel are substantially the same. Thus, variations in the process for forming the transistors, variations in the supply voltage and deviations in the temperature are compensated because they are affecting the threshold voltage of the replica transistor similarly as for the source follower transistors.

In embodiments of the present invention the pixel arrangement is a pixel array comprising a plurality of pixels connected in parallel to an output line. The sources of the source following output transistors of the different pixels are connected together in parallel to the output line. This may be done through a switch. The current source is also connected to the output line, such that, when the switch of one of the pixels is closed, the readout current flows through the source following output transistor which is connected to the closed switch.

In embodiments of the present invention the source following output transistor of the at least one pixel and the at least one replica transistor of the voltage regulating circuit are CMOS transistors.

In embodiments of the present invention the voltage regulating circuit comprises a plurality of replica transistors in parallel.

In embodiments of the present invention the pixel moreover comprises a reset transistor and a shutter transistor. The reset transistor is electrically connected with its drain to the output of the amplifier and with its source to the photodetector, and the shutter transistor is electrically connected with its drain to the source of the reset transistor and with its source to the gate of the source follower transistor.

In embodiments of the present invention the integrator comprises a capacitor between the gate of the source follower transistor and the ground.

In a second aspect embodiments of the present invention relate to a time of flight optical sensor comprising a light source adapted for generating light pulses, and a pixel circuit in accordance with embodiments of the present invention. The pixel circuit is adapted for detecting light pulses generated by the light source after they are reflected on an object.

In a third aspect embodiments of the present invention relate to a method for applying a target voltage on a photodetector pixel arrangement. The photodetector pixel arrangement comprises at least one pixel. The at least one pixel comprises a photodetector, an integrator for accumulating a signal from the photodetector, and a source following output transistor for amplifying the integrated signal. The photodetector pixel arrangement comprises a current source for biasing the source following output transistor by applying a readout current through the source following output transistor. The method comprises:

applying a supply voltage to a drain of at least one replica transistor, the at least one replica transistor being dimensioned substantially the same as the output transistor, applying a current through the at least one replica transistor wherein the applied current is substantially the same as the readout current through the at least one source following output transistor, amplifying the voltage difference between a predefined reference voltage and the voltage at the source of the at least one replica transistor, thus obtaining the target voltage, providing the target voltage to the at least one replica transistor and to the photodetector pixel arrangement.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
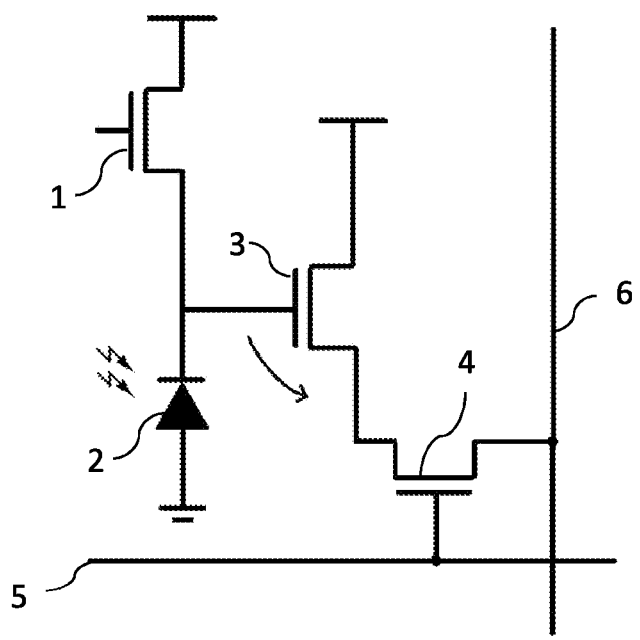
FIG. 1 shows a simplified schematic diagram of a prior art pixel.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a pixel circuit 100 comprising a photodetector pixel arrangement 20 and a voltage regulating circuit 10. The voltage regulating circuit 10 is adapted for applying a target voltage on the pixel arrangement 20.

The photodetector pixel arrangement 20 comprises at least one pixel 30. The photodetector pixel arrangement 20 may comprise a plurality of pixels which are organized in an array and of which the sources of the source following output transistors are connected together in parallel. Each pixel comprises a photodetector 32, an integrator 38 for accumulating a signal from the photodetector 32, and a source following output transistor 37 for amplifying the accumulated signal. The photodetector 32 and the integrator 38 are connected at the integrator node.

The photodetector pixel arrangement 20, moreover, comprises a current source 34 for biasing the source following output transistor 37 by applying a readout current through the source following output transistor.

The voltage regulating circuit 10 comprises an amplifier 11, at least one replica transistor 12, and a replica current source 13.

A gate of the at least one replica transistor 12 is electrically connected with an output node of the amplifier 11, and the output node of the amplifier 11 is electrically connected with the pixel arrangement for providing the target voltage. The amplifier 11 may for example be an operational amplifier.

A drain of the at least one replica transistor 12 is adapted to be electrically connected, during operation, with a power supply.

A source of the at least one replica transistor 12 is electrically connected with a negative input of the amplifier 11, and with the replica current source 13.

The voltage regulating circuit 10 is arranged such that, during operation, a predefined reference voltage can be applied to a positive input node of the amplifier 11.

The at least one replica transistor 12 is dimensioned substantially the same as the output transistor 37 of the at least one pixel 30 and the replica current source 13 is adapted for providing substantially the same current through each replica transistor 12 as the readout current.

In case a plurality of pixels is connected in parallel to the current source, each pixel may comprise a switch which is adapted to connect or disconnect the source following output transistor with the current source, such that the readout current is applied through the connected source following output transistor.

The purpose of the invention is to regulate the reset, and therefore dark voltage of pixels, to an adequate, PVT-independent (Process variation, supply Voltage variation, and Temperature deviation) voltage. This is achieved by regulating the operation voltage of the pixel by using a replica of the output source follower transistor of the pixel in the voltage regulation circuit. By doing so the full-well capacity (i.e. the amount of charge an individual pixel can hold before saturating of the pixels is maximized despite of PVT-variations. By using the voltage regulating circuit, the reset voltage at integration node 38 and at the pixel source follower output is controlled. By controlling the reset voltage at the integration node the full well capacity is controlled and by controlling the source follower pixel output the output (ADC) swing is controlled.

It is an advantage of embodiments of the present invention that a more stable performance can be achieved over a broad temperature range. This is particularly advantageous in a car environment wherein the sensor may be subject to a broad temperature range.

Figure 2:
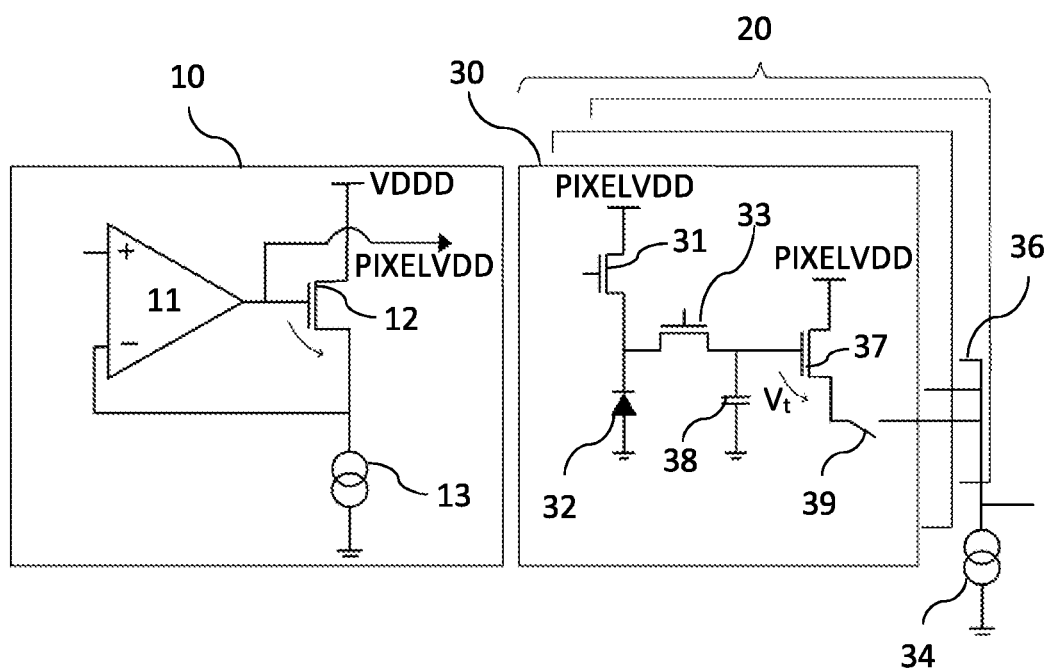
FIG. 2 shows a simplified schematic drawing of a pixel circuit in accordance with embodiments of the present invention.

FIG. 2 shows a simplified diagram of a pixel circuit 100 comprising a photodetector pixel arrangement 20 and a voltage regulating circuit 10 in accordance with an exemplary embodiment of the present invention. The photodetector pixel arrangement 20 comprises one or more pixels 30. In this example the pixels are forming a column and are sharing an output line 36.

In the example of FIG. 2 the pixel is a 3T (three transistor) CMOS pixel and comprises a reset transistor 31, a shutter transistor 33, a source follower 37, a photodetector (32) and an input capacitor 38. In this exemplary embodiment of the present invention the drain of the reset transistor 31 and of the source follower transistor 37 are electrically connected with the output of the amplifier 11. In the example the cathode of the photodetector 32 is electrically connected with the source of the reset pixel 31 and the anode of the photodetector 32 is electrically connected with the ground. The drain of the shutter transistor 33 is electrically connected with the cathode of the photodetector 32 and the source of the shutter transistor is electrically connected with a first terminal of the capacitor 38. The second terminal of the capacitor 38 is electrically connected with the ground. The first terminal of the capacitor 38 is electrically connected with the gate of the source follower transistor 37. The source of the source follower transistor 37 is electrically connected with the current source 34.

The voltage regulating circuit 10 is adapted to be powered by a power supply. Therefore, in the exemplary embodiment illustrated in FIG. 2, the drain of the transistor 12 of the voltage regulating circuit 10 is electrically connected with the power supply. This is illustrated by the supply voltage VDDD which is the supply voltage of the system. This can for example be a bandgap stabilized voltage of 3.3V.

The functionality of the pixel 30 is controlled by the signals at the gate of the reset transistor 31 and at the gate of the shutter transistor 33. In this exemplary embodiment of the present invention both signals have their high level at VDDD. These signals control the gates of the reset transistor 31 and the shutter transistor 33 respectively. Through these signals resetting and detection of the light using the photodetector 32 is enabled. The photodetector may be e.g. a PIN diode or in the case of image sensors a pinned photodiode.

The source follower transistor 37 is used for amplifying the detection result for the readout line 36. In this exemplary embodiment of the present invention the amplifier result is passed through the switch 39 to the column readout line 36. The transistor 37 is a source follower and the photodetector 32 output is connected to the gate of the transistor 37 (through the shutter transistor 33) and the readout line 36 is connected to the source (in this example through the switch 39). A pixel supply voltage PIXELVDD which is generated by the voltage regulating circuit 10 at the output node of the amplifier 11 is supplied to the drain of the source follower transistor 37. The source follower transistor 37 is biased using the current source 34 which is common for all the pixel cells 30 in the column.

It is an advantage of embodiments of the present invention that the output voltage at the output line 36 connected with the source of the source following transistor 37 can be regulated to a constant predefined reference voltage. This voltage may for example be a target voltage between 1 and 2.2 V, for example between 1.6 V and 2 V, for example 1.8V or 1.9V. This is achieved by regulating the supply voltage PIXELVDD to the target voltage plus the threshold voltage (Vt) of source follower transistor 37 in the pixel 30. This voltage (PIXELVDD) will reside on the integration capacitor 38 after a pixel reset.

The target voltage is generated by the voltage regulating circuit 10 by using a transistor 12 which is a replica of the source follower transistor 37 in each pixel cell 30. The voltage regulating circuit 10 uses the threshold voltage of the transistor 12 and a predefined reference voltage for obtaining the regulated output voltage PIXELVDD. This predefined reference voltage may be trimmable. It may for example be 1.8 V. This way the PVT (process variation, supply voltage variation, temperature deviation) conditions of the source follower transistors 37 are compensated because the effects of the change in conditions are affecting the threshold voltage of the replica transistor 12 similarly as for the source follower transistors 37.

In embodiments of the present invention the replica transistor and source follower output transistor 37 are in the same operating conditions and have the same layout. In case of one replica transistor this implies that the same current is flowing through the transistors and the voltage at node Source is substantially the same.

In another embodiment of the present invention the on-chip process variations between the replica 12 and the source follower transistor 37 is minimized by using a plurality (m) of source follower replica transistors in parallel, with a bias current multiplied the same way (the bias current is scaled by m such that the current though each of the source follower replicas is the same as the current through the source follower transistor). By doing so the source follower replica is a larger device and has therefore less on chip variation.

In FIG. 2 the integrator 38 is a separate capacitor. The invention is, however, not limited thereto. Any capacitor which is adapted for accumulating a signal from the photodetector could be used. This could for example be the gate capacitor of the source follower or of the photodetector, or another parasitic capacitor adapted for accumulating a signal from the photodetector.

In a second aspect embodiments of the present invention relate to a time of flight optical sensor. The time of flight optical sensor comprises a light source adapted for generating light pulses, and a pixel circuit in accordance with embodiments of the present invention. The pixel circuit is adapted for detecting light pulses generated by the light source after they are reflected on an object. It is thereby advantageous that the dynamic range is increased by the presence of the voltage regulating circuit as this results in an increased detection range. It is thereby advantageous that far and/or low reflective, dark objects and near and/or high reflective, bright objects can be detected at the same time (e.g. in one measurement with one exposure time).

In a third aspect embodiments of the present invention relate to a method for applying a target voltage on a photodetector pixel arrangement 20. The photodetector pixel arrangement 20 comprises at least one pixel 30 comprising a photodetector 32, an integrator 38 for accumulating a signal from the photodetector 32, and a source following output transistor 37 for amplifying the integrated signal. The photodetector pixel arrangement 20, moreover, comprises a current source 34 for biasing the source following output transistor by applying a readout current through the source following output transistor.

The method comprises:

applying a supply voltage to a drain of at least one replica transistor 12, the at least one replica transistor 12 being dimensioned substantially the same as the output transistor, applying a current through the at least one replica transistor 12 wherein the applied current is substantially the same as the readout current through the source following output transistor 37, amplifying the voltage difference between a predefined reference voltage and the voltage at the source of the at least one replica transistor 12, thus obtaining the target voltage, providing the target voltage to the at least one replica transistor 12 and to the photodetector pixel arrangement 20.

The invention claimed is:

1. A pixel circuit comprising a photodetector pixel arrangement and a voltage regulating circuit adapted for applying a target voltage on the pixel arrangement,
the photodetector pixel arrangement comprising at least one pixel comprising a photodetector, an integrator for accumulating a signal from the photodetector, and a source following output transistor for amplifying the integrated signal,
the photodetector pixel arrangement comprising a current source for biasing the source following output transistor by applying a readout current through the source following output transistor,
the voltage regulating circuit comprising an amplifier, at least one replica transistor, and a replica current source, wherein
a gate of the at least one replica transistor is electrically connected with an output node of the amplifier, and the output node of the amplifier is electrically connected to the drain of the source following output transistor of the at least one pixel for providing the target voltage,
a drain of the at least one replica transistor is adapted to be electrically connected, during operation, with a power supply,
and a source of the at least one replica transistor is electrically connected with a negative input of the amplifier, and with the replica current source,
wherein the voltage regulating circuit is arranged such that, during operation, a predefined reference voltage can be applied to a positive input node of the amplifier,
and wherein the at least one replica transistor is dimensioned substantially the same as the source following output transistor of the at least one pixel and wherein the replica current source is adapted for providing substantially the same current through each replica transistor as the readout current.

2. The pixel circuit according to claim 1, wherein the pixel arrangement is a pixel array comprising a plurality of pixels, and wherein the sources of the source following output transistors of the different pixels are connected together in parallel to an output line and wherein the current source is connected to the output line.

3. The pixel circuit according to claim 1, wherein the source following output transistor of the at least one pixel and the at least one replica transistor of the voltage regulating circuit are CMOS transistors.

4. The pixel circuit according to claim 1, wherein the pixel moreover comprises a reset transistor and a shutter transistor, the reset transistor electrically connected with its drain to the output of the amplifier and with its source to the photodetector, and the shutter transistor connected with its drain to the source of the reset transistor and with its source to the gate of the source follower transistor.

5. The pixel circuit according to claim 1, wherein the integrator comprises a capacitor between the gate of the source follower transistor and the ground.

6. A time of flight optical sensor comprising a light source adapted for generating light pulses, and a pixel circuit in accordance with claim 1, adapted for detecting light pulses generated by the light source after they are reflected on an object.

7. A method for applying a target voltage on a photodetector pixel arrangement, the photodetector pixel arrangement comprising at least one pixel comprising a photodetector, an integrator for accumulating a signal from the photodetector, and a source following output transistor for amplifying the integrated signal, the photodetector pixel arrangement comprising a current source for biasing the source following output transistor by applying a readout current through the source following output transistor, the method comprising:

applying a supply voltage to a drain of at least one replica transistor, the at least one replica transistor being dimensioned substantially the same as the output transistor, applying a current through the at least one replica transistor wherein the applied current is substantially the same as the readout current through the source following output transistor, amplifying the voltage difference between a predefined reference voltage and the voltage at the source of the at least one replica transistor, thus obtaining the target voltage, providing the target voltage to a drain of the source following output transistor.

* * * * *